FISHING REEL

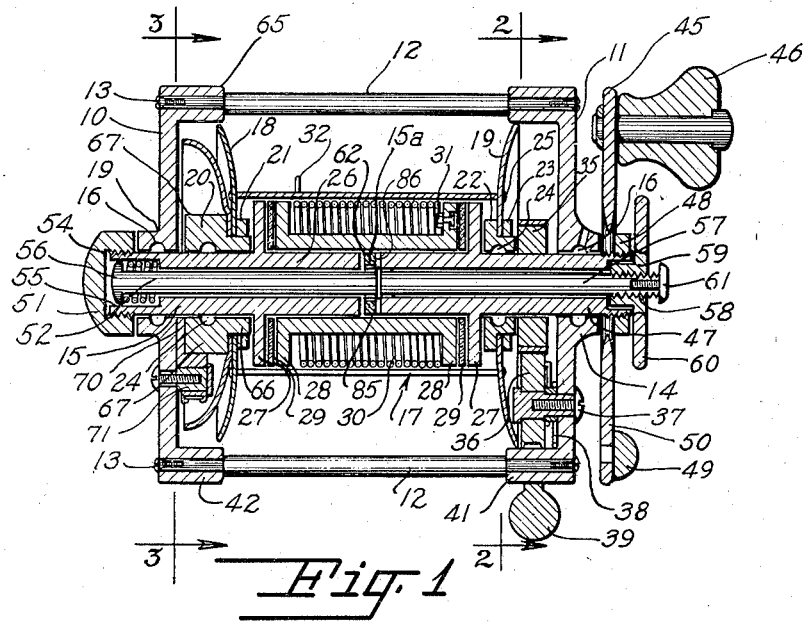
March 1, 1949.  F. M. JACOBSON  2,463,108
FISHING REEL
Filed July 23, 1946  2 Sheets-Sheet 1
Inventor
Fred M. Jacobson
By Christian R. Nielsen
Attorney March 1, 1949.　　　　F. M. JACOBSON　　　　2,463,108

Filed July 23, 1946　　　　　　　　　　　　2 Sheets-Sheet 2

INVENTOR.
Fred M. Jacobson
BY
Christian L. Nielsen
Attorney

Patented Mar. 1, 1949

2,463,108

UNITED STATES PATENT OFFICE 2,463,108

FISHING REEL

Fred M. Jacobson, Bellingham, Wash.

Application July 23, 1946, Serial No. 685,675

8 Claims. (Cl. 242—84.3)

This invention relates to fishing reels. An object of the invention is the provision of a fishing reel in which an alarm is actuated at the instant a fish strikes, the arrangement being such that the alarm may be silenced after the warning has been given.

Another object of the invention is the provision of a fishing reel in which a coiled spring takes up initially the tension on the line until a predetermined degree of strain is reached, when a friction clutch will be brought into action to release the line in a controlled manner, the spring maintaining a taut line when the fish stops fighting so that the fisherman can rewind the line on the reel.

A further object of the invention is the provision of a fishing reel having an alarm to give a warning signal when the fish strikes, with a spring for maintaining a progressively increasing tension on the line to the spasmodic pullings or tuggings of the fish, said spring cooperating with a readily releasable clutch for letting out any length of line during the struggles of the fish.

The invention consists in the novel construction, arrangement and combinations of parts hereinafter more particularly described and claimed.

In the drawings:

Figure 1 is a longitudinal vertical section of a reel constructed according to the principles of my invention.

Figure 2 is a transverse vertical section taken along the line 2—2 of Figure 1.

Figure 3 is a transverse vertical section taken along the line 3—3 of Figure 1.

Figure 4:
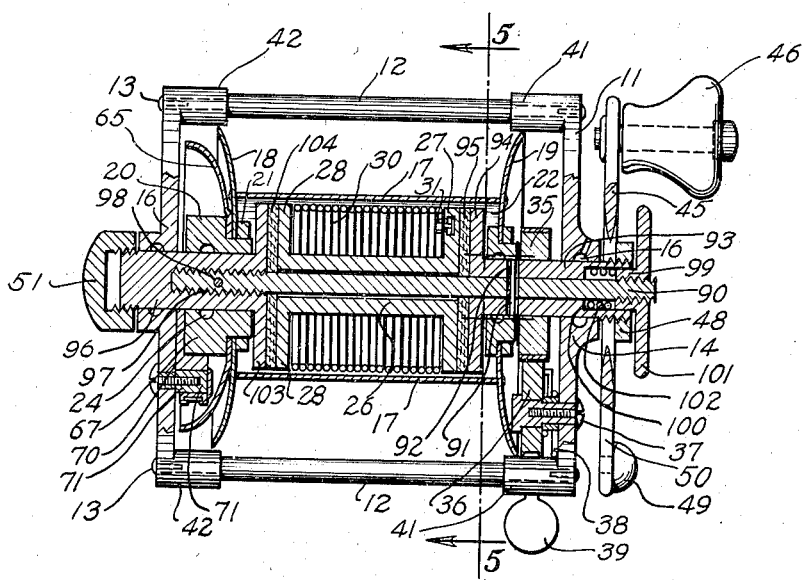
Figure 4 is a longitudinal vertical section similar to that shown in Figure 1, but disclosing a modified form of a clutching mechanism.
Figure 5:
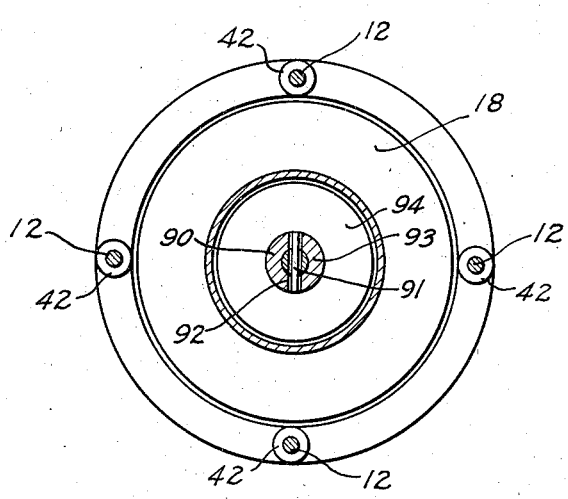
Figure 5 is a transverse vertical section taken along the line 5—5 of Figure 4.

Referring more particularly to the drawings 10 and 11 designate circular side walls of a casing. Rods 12 and bolts 13 hold the side walls in spaced relation. The centers of the walls have journals 14 for the outer ends of a split shaft 15. Annular grooves 16 in said journals are provided with felt oilers. A cylindrical reel 17 is provided with spaced flared disks 18 and 19. Disk 18 is secured to a bearing 20 by a ring 21 while disk 19 is secured to a bearing 22 by a ring 23. The bearings are mounted on the shaft 15 and have circular grooves 24 to receive felt oilers. The opposite ends of the reel 17 has projecting lugs 25 which are bent after passing through perforations in the disks 18 and 19 for securing the disks to the cylindrical reel.

A sleeve 26 is mounted on the shaft 15 between a pair of annular flanges 27 integrally formed with the sections of the shaft. At each end of the sleeve is an integrally formed circular flange 28. Each flange is slightly spaced from an adjacent flange 27 so that fiber friction disks 29 may be received by the shaft with a friction disk being located between each pair of coordinated flanges 27—28 and 27 and 29.

A coil spring 30 has one end secured at 31 to one flange 28 of the sleeve while the other end of the spring is passed through a perforation in the reel 17 and formed into an eye 32 to which is attached one end of the fishing line which is wound on the reel 17. The spring 30 is coiled about the sleeve 26.

A gear 35 is keyed to the shaft 15 and a pawl 36 pivoted at 37 on the disk 11 has teeth engaging the teeth of the gear. A spring 38 retains the pawl in engagement with the gear 35. An operating handle 39 projects through an opening 40 in an annular flange 41 projecting laterally inwardly from the periphery of the disk 11. The disk 10 has a similar flange 42.

A crank 45 having an operating handle 46 is threaded onto one end of the section 47 of the shaft 15. A nut 48 threaded on said end secures the crank in position. A counter-balance 49 is located on an extension 50 of the crank.

A cap nut 51 is threaded on the opposite end of the shaft 15. A rod 52 controls the tension on the braking disks 29 by moving the sections of the shaft 15 towards or away from each other against the tension of a spring 54 which is mounted in a pocket 55 at one end of the shaft 15. A head 56 on the rod 52 maintains the spring in said pocket.

The end 57 of the rod 52 has a threaded portion 58 onto which is screwed a nut 59 having a hand wheel 60. A headed bolt 61 maintains the nut on the rod. The nut 59 is rotatably mounted in a pocket in the section 47 of the shaft 15.

The inner alined ends of the shaft 15 are splined together as shown at 15—a so that the sections of the shaft will revolve simultaneously. A felt oiler 62 lubricates the shaft and the sleeve 26.

A bell 65 has a central opening which is neatly received by a reduced portion 66 of the bearing 20 on the shaft 15. The clinching ring 21 in cooperation with the disk 18 binds the bell on the bearing so that when the reel 17 is revolved the bearing 20 and said bell will be rotated. The bearing 20 as shown in Figure 3 is provided with oppositely disposed cams 67.

A bell clapper includes a lever 70 pivoted on the disk 10 in vertical alinement with the cams 67. A flat spring 72 has one end 73 engaged by a pin 74 on the disk 10. The opposite end of said spring has a button 75 secured thereto and this button strikes the bell 65. The intermediate portion of the spring is received by a slot formed in the bottom of the enlarged portion 76 of the lever 70 with inturned flanges 76—a holding the spring in place. The spring 72 retains the button 75 normally in continuous engagement with the bell 65 when the clapper is in operation and also retains the lever 70 against a pin 77 secured to the inner face of the disk 10. However, when the shaft 15 is rotated the cams 67 will act on the free end of the lever 70 thereby rocking said lever, causing the button 75 to be raised and lowered alternately for ringing the bell. The lever 70 has a cam portion 78 which is engaged by the diametrically disposed cams 67 for rocking said lever. This lever has a curved portion 79 which clears the cams 67 so that the spring 72 may return said lever to the stops or pin 77.

A bell silencer 80 is connected to a pin 80—a which is slidably mounted in a slot 81 in the disk 10. When the pin is moved downwardly (Fig. 3) the silencer will engage cam portion 78 of the lever 70 and thus move the lever out of the path of the revolving cams.

A pin 85 is inserted through a passage 86 in the section 47 of the shaft 15 and also through a passage in the rod 57 so that the nut 59 may be adjusted.

The operation of the reel shown in Figures 1 to 3 inclusive is as follows: One end of the line is secured to the hook 32 on one end of the spring 30. The crank is operated and the line is wound on the reel core 17 because the shaft 15 rotates the reel. The pawl 36 engaging the gear 35 will hold the reel, the shaft and crank against rotation.

The release of the pawl will permit the line to be cast with the reel being reversely revolved. When the finger has been removed from the member 39 the spring 38 will reseat the pawl into operation engagement with the gear 35.

The finger piece 60 on the nut 59 is adjusted so that the annular flanges 27 will exert the proper pressure on the friction disks 29 and flanges 28 and 29 on the sleeve 26 so that if a fish should strike and pull on the line the reel will be revolved by the line and cause the spring 30 to be wound on the sleeve, thereby progressively increasing the tension on the line.

After the spring 30 has taken up the tension by being wound on the sleeve, the friction disks 29 will permit the sleeve to slip and play out several hundred feet of said line. The nut 59 must be adjusted to take care of the slippage of the reel and the sleeve 26 so that the line on said reel may be released as is necessary.

As has been stated, the pawl 36 is released when the line is cast and said pawl must be maintained in an inoperative position so that when the fish has been caught by the hook on the end of the line and pulls on the line the bell 65 will be rotated, as will the lever 70 around the cams 67 whereby said cams will be engaged periodically by the cam portion 78 on said lever for oscillating the member 75 for ringing the bell and thus indicating that a fish is pulling on the line against the tension of the spring 30 embracing the sleeve 26.

When the fish stops fighting, the spring 26 will keep the line taut and the fisherman will keep on winding the line on the reel.

Referring more particularly to Figure 4, it will be seen that the modified portion of the reel relates to the braking device and the operating shaft. Since all of the other parts have the same construction as the similarly positioned elements of Figure 1, the same reference numerals will be applied thereto.

A tension rod 90 has a pin 91 inserted through a passage 92 on a section 93 of a shaft on which is integrally formed a circular flange 94. A fiber friction disk 95 is located between the flange 94 and the flange 27 on the sleeve 26 rotatably mounted on the rod 90.

A second section 96 of the operating shaft for the reel core 17 is threaded at 97 on one end of the rod 90 and a pin 98 secures the section of the shaft to said rod so that when the section 93 of the shaft is rotated by the crank 45 or by the reel core 17 when the line is payed out, the section 96 of the shaft will likewise be revolved. However, since the passage 92 in the section 93 is wider than the diameter of the pin 91 said section may be moved longitudinally on the rod 90 when a nut 99 threaded into a pocket 100 is rotated by a finger piece 101 against the tension of a spring 102 mounted in said pocket.

A flange 103 is formed integrally with the inner end of the section 96 of the shaft and in spaced relation with the flange 28 on the sleeve 26. A fiber friction disk 104 is located between the flanges 28 and 103.

In the modified form shown in Figure 4, rotation of the crank revolves the shaft section 93 and likewise the rod 90. The shaft section 96 is simultaneously revolved because both sections are connected to the rod 90.

When the finger piece 101 is rotated, the nut 99 will cause the flanges 92 and 103 to move towards or away from each other for increasing or decreasing the friction of disks 95 and 104 on the respective pairs of flanges 27—94 and 28—103.

The friction disks 95 and 104 in Figure 4 function in an identical manner as do the friction disks 29 in Figure 1, and therefore the operations of the fishing reels shown in Figures 1 and 4 are identical.

Although preferred and practical embodiments of the invention are disclosed herein, it is to be understood that various modifications may be made within the scope of the appended claims.

I claim:

1. In a fishing reel, a shaft formed of two hollow sections being slidably keyed together, a sleeve received by the inner ends of the sections, a flange at each end of the sleeve, a friction disk in engagement with each flange, a flange on each section of the shaft and in engagement with a friction disk, a reel rotatably mounted on the shaft, a coil spring having one end connected to the sleeve and the other end connected to the reel, a rod received by the hollow sections and secured to one section, a head on one end of the rod, a nut threaded on the other end of the rod and a resilient means between the head and one end of a section tending to pull the sections toward each other to cause pairs of the flanges to clamp the friction disk therebetween so that the sleeve, sections of the shaft and reel may be rotated simultaneously in either direction, adjustment of the nut providing slippage between the reel and shaft.

2. In a fishing reel, a shaft formed of two hollow alined sections, a flange on each section, a sleeve having its longitudinal axis alined with the longitudinal axes of the sections, a flange at each end of the sleeve and spaced from a flange on a section of the shaft, a friction disk between each pair of spaced flanges, a rod received by the hollow sections, a plurality of means slidably connecting the sections together on and to the rod, cooperating means on a shaft section and the rod for moving the shaft sections toward or away from each other to cause the friction disks to connect the sleeve with the shaft sections by means of the flanges or to release the sleeve, a reel rotatable on the shaft sections, a coil spring on the sleeve connecting said sleeve with the reel, and means manually rotating the shaft and the reel for winding the line on said reel, reverse rotation of the reel when the line is drawn out causing the reel to wind the spring on the sleeve.

3. In a fishing reel, a shaft formed of two hollow alined sections, a sleeve having its longitudinal axis alined with the longitudinal axes of the shaft sections, a friction disk at each end of the sleeve, cooperating means on the inner ends of the shaft sections and on the ends of the sleeve for confining the disks therebetween, a reel mounted rotatably on the shaft sections and encircling the sleeve, a coil spring on the sleeve connecting the reel with the sleeve, means moving the shaft sections toward or away from each other for causing the cooperating means on the shaft section and the sleeve to provide a direct connection or slippage between the sleeve and shaft sections so that when the line is drawn out the spring will be wound on the sleeve and the reel will be allowed to turn independently of the sleeve.

4. In a fishing reel, a shaft formed of two hollow alined sections having the inner ends slidably connected together, a rod received by the shaft sections, each section having a flange thereon, a sleeve on the shaft sections and located between the flanges, a flange on each end of the sleeve and forming with a flange of a shaft section of a pair of spaced flanges, a friction disk located between each pair of flanges means loosely connecting the rod with one of the shaft sections so that the rod may be held against rotation when desired, the outer end of the last-mentioned shaft section having a pocket therein, a nut received by the pocket and threaded onto the rod for causing the rod to draw the shaft sections together and clamp the friction disks against the flanges on the sleeve, a reel on the shaft sections, a coil spring on the sleeve connecting the sleeve with the reel, and means retaining the reel against rotation in one direction, adjustment of the nut providing for slippage of the reel on the shaft sections.

5. In a fishing reel, a shaft formed of two hollow alined sections, a flange on each section, a sleeve having its longitudinal axis alined with the longitudinal axes of the shaft sections, a flange at each end of the sleeve and spaced from a flange on a section of the shaft, a friction disk between each pair of spaced flanges, a rod received by the hollow sections, a plurality of means slidably connecting the sections together on and to the rod, one shaft section having a pocket in one end, a nut seated in the pocket and threaded on the rod, said nut being adjusted on the rod against the bottom wall of the pocket for moving the shaft sections together to cause the friction disks to connect the sleeve with the shaft sections by means of the flanges or to release the sleeve, a reel rotatable on the shaft sections, a coil spring on the sleeve connecting said sleeve with the reel, and means manually rotating the shaft and the reel for winding the line on said reel, reverse rotation of the reel when the line is drawn out causing the reel to wind the spring on the sleeve.

6. In a fishing reel, a casing having end walls, a shaft mounted for rotation in the casing; a reel mounted for rotation on the shaft, means for connecting the shaft to the reel, means for manually rotating the reel for winding a line on the reel, a bell connected to the reel and rotatable therewith, a lever pivoted on one of the end walls adjacent the bell and provided with a cam portion, a clapper connected to the lever and spaced from the bell cams connected to the bell, and rotatable therewith, said cams adapted to periodically engage the cam portion on the lever when the reel and bell are rotated by the line as it is drawn off the reel for causing the clapper to strike the bell.

7. In a fishing reel, a casing having end walls, a shaft mounted for rotation in the casing; a reel mounted for rotation on the shaft, means for connecting the shaft to the reel, means for manually rotating the reel for winding a line on the reel, a bell connected to the reel and rotatable therewith, a lever pivoted on one of the end walls adjacent the bell and provided with a cam portion, a spring connected to the lever for retaining the lever in a predetermined position, a clapper connected to one end of the spring in contacting relation with the bell, cams attached to the bell and rotatable therewith, said cams adapted to engage periodically the cam portion on the lever when the reel and ball are rotated by the line as it is drawn off the reel for causing the clapper to strike the bell.

8. In a fishing reel, a casing having end walls, a shaft mounted for rotation in the casing; a reel mounted for rotation on the shaft, means for connecting the shaft to the reel, means for manually rotating the reel for winding a line on the reel, a bell connected to the reel and rotatable therewith, a lever pivoted on one of the end walls adjacent the bell and provided with a cam portion, a spring connected to the lever for retaining the lever in a predetermined position, a clapper connected to one end of the spring in contacting relation with the bell, cams attached to the bell and rotatable therewith, said cams adapted to engage periodically the cam portion on the lever when the reel and bell are rotated by the line as it is drawn off the reel for causing the clapper to strike the bell, and means for moving the lever and cam portion thereon to an inoperative position away from the revolving cams.

FRED M. JACOBSON.

REFERENCES CITED

The following references are of record in the file of this patent:

UNITED STATES PATENTS

| Number | Name | Date |
|---|---|---|
| 685,185 | Smith | Oct. 22, 1901 |
| 822,113 | Glocker | May 29, 1906 |